United States Patent
Yao et al.

(10) Patent No.: US 12,556,255 B2
(45) Date of Patent: Feb. 17, 2026

(54) COMMUNICATION IN MULTIPLE TRANSMISSION/RECEPTION POINT ENVIRONMENTS

(71) Applicant: ZTE CORPORATION, Guangdong (CN)

(72) Inventors: Ke Yao, Shenzhen (CN); Bo Gao, Shenzhen (CN); Chuangxin Jiang, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 299 days.

(21) Appl. No.: 18/178,250

(22) Filed: Mar. 3, 2023

(65) Prior Publication Data
US 2023/0208597 A1    Jun. 29, 2023

Related U.S. Application Data

(63) Continuation of application No. PCT/CN2020/123108, filed on Oct. 23, 2020.

(51) Int. Cl.
*H04B 7/06* (2006.01)
*H04L 5/00* (2006.01)
*H04W 72/231* (2023.01)

(52) U.S. Cl.
CPC ....... *H04B 7/06952* (2023.05); *H04L 5/0051* (2013.01); *H04W 72/231* (2023.01)

(58) Field of Classification Search
None
See application file for complete search history.

(56) References Cited

U.S. PATENT DOCUMENTS

| 11,641,261 | B1* | 5/2023 | Khoshnevisan | H04L 1/189 370/329 |
| 12,047,963 | B2* | 7/2024 | Zhang | H04B 7/0695 |
| 2018/0206132 | A1* | 7/2018 | Guo | H04W 72/0473 |
| 2019/0312698 | A1* | 10/2019 | Akkarakaran | H04W 72/046 |

(Continued)

FOREIGN PATENT DOCUMENTS

| CN | 111758272 A | 10/2020 |
| WO | WO-2019/068643 A1 | 4/2019 |

OTHER PUBLICATIONS

Extended European Search Report on EP 20958282.4 dated Aug. 10, 2023 (15 pages).

(Continued)

*Primary Examiner* — Otis L Thompson, Jr.
(74) *Attorney, Agent, or Firm* — Foley & Lardner LLP

(57) ABSTRACT

Presented are systems, methods, apparatuses, or computer-readable media for communication in multiple transmission/reception point (TRP) environments. A wireless communication device may receive, from a wireless communication node, a configuration of at least one sounding reference signal (SRS) resource. The wireless communication device may receive, from the wireless communication node, an indication of at least one beam state. The wireless communication device may determine at least one first SRS resource according to the at least one beam state and the at least one SRS resource. The wireless communication device may determine a transmission parameter for an uplink transmission, according to the at least one first SRS resource.

15 Claims, 8 Drawing Sheets

(56) References Cited

U.S. PATENT DOCUMENTS

| | | | |
|---|---|---|---|
| 2020/0044797 A1 | 2/2020 | Guo | |
| 2020/0106645 A1 | 4/2020 | Tsai et al. | |
| 2020/0280416 A1 | 9/2020 | Gao et al. | |
| 2020/0314664 A1* | 10/2020 | Zhou | H04B 7/0617 |
| 2020/0314860 A1 | 10/2020 | Zhou et al. | |

OTHER PUBLICATIONS

Ericsson, "Enhancements on Multi-beam Operation", 3GPP TSG-RAN WG1 Meeting #103-e, R1-2009288, Nov. 13, 2020, Online (20 pages).

Ericsson: "Non-codebook based UL MIMO remaining details" 3GPP TSG-RAN WG1 #91; R1-1720739; Dec. 1, 2017; Reno, USA (6 pages).

Futurewei, "Enhancement on multi-beam operation", 3GPP TSG RAN WG1 Meeting #103-e, R1-2007546, Nov. 13, 2020, e-Meeting (9 pages).

Huawei et al., "Enhancements on multi-beam operation in Rel-17", 3GPP TSG RAN WG1 Meeting #103-e, R1-2007586, Nov. 13, 2020, e-Meeting (11 pages).

Intel Corporation, "Enhancements on Multi-Beam Operation", 3GPP TSG RAN WG1 #103-e, R1-2008977, Nov. 13, 2020, e-Meeting (16 pages).

International Search Report and Written Opinion for PCT Appl. No. PCT/CN2020/123108, mailed Jul. 29, 2021 (8 pages).

LG Electronics, "Enhancements on Multi-beam Operation", 3GPP TSG RAN WG1 #102-e, R1-2006596, Jul. 28, 2020, e-Meeting (6 pages).

LG Electronics, "Enhancements on Multi-beam Operation", 3GPP TSG RAN WG1 #103-e, R1-2008573, Nov. 13, 2020, e-Meeting (11 pages).

Mediatek Inc., "Enhancement on multi-beam operation", 3GPP TSG RAN WG1 #102-e, R1-2005619, Aug. 28, 2020, e-Meeting (7 pages).

Mediatek Inc., "Enhancement on multi-beam operation", 3GPP TSG RAN WG1 #103-e, R1-2008956, Nov. 13, 2020, e-Meeting (16 pages).

Moderator (Samsing), "Moderator summary#5 for multi-beam enhancement", 3GPP TSG RAN WG1 #103-e, R1-2009749, Nov. 13, 2020, e-Meeting (12 pages).

Moderator (Samsung), "Moderator summary for multi-beam enhancement", 3GPP TSG RAN WG1 #103-e, R1-2008147, Nov. 13, 2020, e-Meeting (30 pages).

Moderator (Samsung), "Moderator summary for multi-beam enhancement: proposal categorization", 3GPP TSG RAN WG1 #102-e, R1-2006985, Aug. 28, 2020, e-Meeting (27 pages).

Moderator (Samsung), "Moderator summary#2 for multi-beam enhancement: proposal categorization" 3GPP TSG RAN WG1 #102-e, R1-2007189, Aug. 28, 2020, e-Meeting (27 pages).

Moderator (Samsung), "Moderator summary#4 for multi-beam enhancement", 3GPP TSG RAN WG1 #103-e, R1-2009715, Nov. 13, 2020, e-Meeting (16 pages).

Qualcomm Incorporated, "Enhancements on Multi-beam Operation", 3GPP TSG RAN WG1 Meeting #102-e, R1-2006790, Aug. 28, 2020, e-Meeting (7 pages).

Samsung, "On Rel.17 FeMIMO WI", 3GPP TSG RAN WG1 #101, R1-2003918, Jun. 5, 2020, e-Meeting (12 pages).

Vivo, "Further discussion on multi beam enhancement", 3GPP TSG RAN WG1 #103-e, R1-2007644, Nov. 13, 2020, e-Meeting (26 pages).

ZTE, "Enhancements on Multi-beam Operation", 3GPP TSG RAN WG1 Meeting #103-e, R1-2007763, Nov. 13, 2020, e-Meeting (19 pages).

ZTE: "UL beam management for NR MIMO" 3GPP TSG RAN WG1 Meeting #89; R1-1707120; May 19, 2017; Hangzhou, P.R. China (6 pages).

Singapore Examination Report and Written Opinion Appl. No. 11202301586T on SG dated Jul. 15, 2025 (8 pages).

* cited by examiner

COMMUNICATION IN MULTIPLE TRANSMISSION/RECEPTION POINT ENVIRONMENTS

CROSS-REFERENCE TO RELATED APPLICATION

This application claims the benefit of priority under 35 U.S.C. § 120 as a continuation of PCT Patent Application No. PCT/CN2020/123108, filed on Oct. 23, 2020, the disclosure of which is incorporated herein by reference in its entirety.

TECHNICAL FIELD

The disclosure relates generally to wireless communications, including but not limited to systems and methods for communicating in multiple transmission/reception point (MTRP) environments.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive, from a wireless communication node, a configuration (e.g., RRC signaling or configuration) of at least one sounding reference signal (SRS) resource. The wireless communication device may receive, from the wireless communication node, an indication of at least one beam state. The wireless communication device may determine at least one first SRS resource according to the at least one beam state and the at least one SRS resource. The wireless communication device may determine a transmission parameter for an uplink transmission (e.g., physical uplink shared channel (PUSCH) or physical uplink control channel (PUCCH)), according to the at least one first SRS resource.

In some embodiments, the indication may include at least one of indication via a downlink control information (DCI) or activation via a medium access control control element (MAC CE) signaling. In some embodiments, each of the at least one beam state may include at least one of: a quasi co-location (QCL) information, a transmission configuration indicator (TCI) state, spatial relation information, reference signal information, spatial filter information, or precoding information. The transmission parameter may include at least one of transmit antenna port, the precoder, a number of layers, spatial relation information, the spatial filters, and QCL information, among others In some embodiments, the wireless communication device may determine a transmission parameter for the at least one SRS resource, according to the at least one beam state. In some embodiments, the wireless communication device may determine a transmission parameter for the at least one first SRS resource, according to the at least one beam state.

In some embodiments, the at least one beam state may be associated with the at least one SRS resource. In some embodiments, one of the at least one beam state may be associated with one of the at least one SRS resource. In some embodiments, one of the at least one beam state may be associated with a group of SRS resources from at least one group of SRS resources. The at least one group of SRS resources may be obtained from the at least one SRS resource. In some embodiments, one of the at least one beam state may be associated with an SRS resource set from at least one SRS resource set. The SRS resource set may include one or more of the at least one SRS resource.

In some embodiments, each of the at least one beam state may be respectively associated with N SRS resources or N groups of SRS resources in an SRS resource set. In some embodiments, each of the at least one beam state may be respectively associated with N SRS resources or N groups of SRS resources. Each of the N SRS resources or the N SRS resource groups may be in a respective SRS resource set. In some embodiments, each of the at least one beam state may be respectively associated with first or last N SRS resources or first N or last groups of SRS resources in an SRS resource set. In some embodiments, each of the at least one beam state may be respectively associated with first N SRS resources or first N SRS resource groups. Each of the N SRS resources or the N SRS resource groups may be in a respective SRS resource set. In some embodiments, N may be an integer that is equal to a number of beam states of the at least one beam state.

In some embodiments, the wireless communication device may determine a transmission parameter for at least a second SRS resource, according to the at least one beam state. The second SRS resource may be associated with the at least one beam state. In some embodiments, the wireless communication device may transmit at least one SRS according to the transmission parameter for the at least one SRS resource, the at least one first SRS resource or the at least one second SRS resource.

In some embodiments, the wireless communication device may determine an association between one of the at least one beam state and one of the at least one SRS resource or one of the at least one group of SRS resources or one of the at least one SRS resource sets, according to the at least one beam state and the at least one SRS resource or the one of the at least one group of SRS resources or the one of the at least one SRS resource set being associated with a transmission reception point (TRP).

In some embodiments, the TRP may include or correspond to a control resource set (CORESET) pool identifier (ID), a physical cell ID (PCI), a transmission configuration indicator (TCI) state, a TCI state group, a beam state or a beam state group.

In some embodiments, the wireless communication device may determine an association between one of the at least one beam state, and one of the at least one SRS resource or one of the at least one group of SRS resources or one of the at least one SRS resource set. The determination may be according to at least one of: an identifier of the at least one SRS resource in the one of the at least one SRS resource set; an identifier of the one of the at least one SRS resource set; an identifier of the one of the at least one SRS resource set; an identifier of the one of the at least one group of SRS resources; a position of the at least one beam state in a transmission configuration indicator (TCI) state codepoint; and a control resource set (CORESET) pool identifier (ID) associated with the one of the at least one beam state.

In some embodiments, the wireless communication device may determine an association between the at least one beam state and the at least one SRS resource, in response to the at least one SRS resource having a spatial relation which is same as or Quasi Co-Located (QCLed) with an RS of the at least one beam state. In some embodiments, the wireless communication device may determine the at least one first SRS resource according to an association between the at least one beam state and the at least one SRS resource.

In some embodiments, the wireless communication device may receive, from the wireless communication node, an SRS resource indicator (SRI) for the uplink transmission. In some embodiments, the wireless communication device may determine the at least one first SRS resource according to the at least one beam state and the SRI.

In some embodiments, one of the at least one beam state may be associated with an SRS resource set or a group of SRS resources from the at least one SRS resource, and the SRI indicates the at least one first SRS resource in the SRS resource set or in the group of SRS resources. In some embodiments, in response to the indication of the at least one beam state indicating more than one SRS resource, the SRI may indicate the at least one first SRS resource in the more than one SRS resource.

In some embodiments, the wireless communication device may receive from the wireless communication node, a port information for the uplink transmission. In some embodiments, the wireless communication device may determine a precoder for the uplink transmission, according to the first SRS resource and the port information.

In some embodiments, the first SRS resource may support one or more ports. In some embodiments, a usage of the first SRS resource, or of a SRS resource set may include the first SRS resource, may be non-codebook or codebook. In some embodiments, the port information of the uplink transmission may include: transmitted precoding matrix indicator (TPMI) or port selection information for the uplink transmission.

In some embodiments, a precoding matrix corresponding to the TPMI may include primary diagonal elements that are each equal to 0 or 1, and non-primary diagonal elements that are each equal to 0. In some embodiments, the port selection information may include an index of a predefined port combination.

In some embodiments, the wireless communication device may receive, from the wireless communication node via a downlink control information (DCI) transmission. The indication may indicate N1 beam states. In some embodiments, the wireless communication device may apply the N1 beam states to the uplink transmission in N1 time units respectively. N1 may be an integer and equal a number of beam states of the at least one beam state.

In some embodiments, the wireless communication device may receive, from the wireless communication node via M downlink control information (DCI) transmissions, an indication to transmit M uplink transmissions at least partially overlapped in time, using more than one beam states. M may be an integer. In some embodiments, the wireless communication device may transmit a first uplink transmission among the M uplink transmissions. In some embodiments, the wireless communication device may cancel or delay uplink transmissions other than the first uplink transmission among the M uplink transmissions.

In some embodiments, the wireless communication device may determine the first uplink transmission according to a priority of a transmission reception point (TRP) or a panel related to the M uplink transmissions. In some embodiments, the wireless communication device may determine the first uplink transmission as an uplink transmission related to a TRP or a panel that has a highest priority among a plurality of TRPs or panels, according to a configuration that is predefined or a configuration of the wireless communication node.

In some embodiments, the wireless communication device may determine a transmission reception point (TRP) corresponding to the uplink transmission, according to a control resource set (CORESET) pool identifier (ID) that is associated with a downlink control information (DCI) that indicates a beam state of the uplink transmission. In some embodiments, the wireless communication device may determine at least one power control parameter associated with one or more beam states.

In some embodiments, the at least one power control parameter may include at least one of: P0 and alpha for the uplink transmission comprising a physical uplink shared channel (PUSCH), configured by an index from a P0 and alpha parameter pool configured for the PUSCH or for an uplink channel; P0 for the uplink transmission comprising a physical uplink control channel (PUCCH) determined by an P0_offset and a P0 for an associated PUSCH; or a closed-loop power control index that is: configured for the one or more beam states via radio resource control (RRC) signaling, or associated with the one or more beam states when activated by a medium access control control element (MAC CE), or associated with the one or more beam states according to a transmission reception point (TRP) associated with the one or more beam states, or shared by a plurality of transmission reception points (TRPs), and corresponds to an independent respective closed-loop power control for each TRP of the plurality of TRPs.

At least one aspect is directed to a system, a method, an apparatus, or a computer-readable medium. A wireless communication node may transmit, to a wireless communication device, a configuration of at least one sounding reference signal (SRS) resource. The wireless communication node may transmit, to the wireless communication device, an indication of at least one beam state. The wireless communication node may cause the wireless communication device to determine at least one first SRS resource according to the at least one beam state and the at least one SRS resource. The wireless communication node may cause the wireless communication device to determine a transmission parameter for an uplink transmission, according to the at least one first SRS resource.

In some embodiments, the indication may include at least one of indication via a downlink control information (DCI) or activation via a medium access control control element (MAC CE) signaling. In some embodiments, each of the at least one beam state may include at least one of: a quasi co-location (QCL) state, a transmission configuration indicator (TCI) state, spatial relation information, reference signal information, spatial filter information, or precoding information. The transmission parameter may include at least one of transmit antenna port, the precoder, a number of layers, spatial relation information, the spatial filters, and QCL information, among others.

In some embodiments, the wireless communication node may cause the wireless communication device to determine a transmission parameter for the at least one SRS resource, according to the at least one beam state. In some embodiments, the wireless communication node may cause the wireless communication device to determine a transmission parameter for the at least one first SRS resource, according to the at least one beam state.

In some embodiments, the at least one beam state may be associated with the at least one SRS resource. In some embodiments, one of the at least one beam state may be associated with one of the at least one SRS resource. In some embodiments, one of the at least one beam state may be associated with a group of SRS resources from at least one group of SRS resources. The at least one group of SRS resources may be obtained from the at least one SRS resource. In some embodiments, one of the at least one beam state may be associated with an SRS resource set from at least one SRS resource set. The SRS resource set may include one or more of the at least one SRS resource.

In some embodiments, each of the at least one beam state may be respectively associated with N SRS resources or N groups of SRS resources in an SRS resource set. In some embodiments, each of the at least one beam state may be respectively associated with N SRS resources or N groups of SRS resources. Each of the N SRS resources or the N SRS resource groups may be in a respective SRS resource set. In some embodiments, each of the at least one beam state may be respectively associated with first N or last SRS resources or first or last N groups of SRS resources in an SRS resource set. In some embodiments, each of the at least one beam state may be respectively associated with first N or last SRS resources or first N or last SRS resource groups. Each of the N SRS resources or the N SRS resource groups may be in a respective SRS resource set. In some embodiments, N may be an integer that is equal to a number of beam states of the at least one beam state.

In some embodiments, the wireless communication node may cause the wireless communication device to determine a transmission parameter for at least a second SRS resource, according to the at least one beam state. The second SRS resource may be associated with the at least one beam state. In some embodiments, the wireless communication node may receive at least one SRS according to the transmission parameter for the at least one SRS resource, the at least one first SRS resource or the at least one second SRS resource.

In some embodiments, the wireless communication node may cause the wireless communication device to determine an association between one of the at least one beam state and one of the at least one SRS resource or one of the at least one group of SRS resources or one of the at least one SRS resource sets, according to the at least one beam state and the at least one SRS resource or the one of the at least one group of SRS resources or the one of the at least one SRS resource set being associated with a transmission reception point (TRP).

In some embodiments, the TRP may include or correspond to a control resource set (CORESET) pool identifier (ID), a physical cell ID (PCI), a transmission configuration indicator (TCI) state, a TCI state group, a beam state or a beam state group.

In some embodiments, the wireless communication node may cause the wireless communication device to determine an association between one of the at least one beam state, and one of the at least one SRS resource or one of the at least one group of SRS resources or one of the at least one SRS resource set. The determination may be according to at least one of: an identifier of the at least one SRS resource in the one of the at least one SRS resource set; an identifier of the one of the at least one SRS resource set; an identifier of the one of the at least one SRS resource set; an identifier of the one of the at least one group of SRS resources; a position of the at least one beam state in a transmission configuration indicator (TCI) state codepoint; and a control resource set (CORESET) pool identifier (ID) associated with the one of the at least one beam state.

In some embodiments, the wireless communication node may cause the wireless communication device to determine an association between the at least one beam state and the at least one SRS resource, in response to the at least one SRS resource having a spatial relation which is same as or Quasi Co-Located (QCLed) with an RS of the at least one beam state. In some embodiments, the wireless communication node may cause the wireless communication device to determine the at least one first SRS resource according to an association between the at least one beam state and the at least one SRS resource.

In some embodiments, the wireless communication node may transmit, to the wireless communication device, an SRS resource indicator (SRI) for the uplink transmission. In some embodiments, the wireless communication node may cause the wireless communication device to determine the at least one first SRS resource according to the at least one beam state and the SRI.

In some embodiments, one of the at least one beam state may be associated with an SRS resource set or a group of SRS resources from the at least one SRS resource, and the SRI indicates the at least one first SRS resource in the SRS resource set or in the group of SRS resources. In some embodiments, in response to the indication of the at least one beam state indicating more than one SRS resource, the SRI may indicate the at least one first SRS resource in the more than one SRS resource.

In some embodiments, the wireless communication node may transmit to the wireless communication device, a port information for the uplink transmission. In some embodiments, the wireless communication node may cause the wireless communication device to determine a precoder for the uplink transmission, according to the first SRS resource and the port information.

In some embodiments, the first SRS resource may support one or more ports. In some embodiments, a usage of the first SRS resource, or of a SRS resource set may include the first SRS resource, may be non-codebook or codebook. In some embodiments, the port information of the uplink transmission may include: transmitted precoding matrix indicator (TPMI) or port selection information for the uplink transmission.

In some embodiments, a precoding matrix corresponding to the TPMI may include primary diagonal elements that are each equal to 0 or 1, and non-primary diagonal elements that are each equal to 0. In some embodiments, the port selection information may include an index of a predefined port combination.

In some embodiments, the wireless communication node may transmit, to the wireless communication device via a downlink control information (DCI) transmission. The indication may indicate N1 beam states. In some embodiments, the wireless communication node may cause the wireless communication device to apply the N1 beam states to the uplink transmission in N1 time units respectively. N1 may be an integer and equal a number of beam states of the at least one beam state.

In some embodiments, the wireless communication node may transmit, to the wireless communication device via M downlink control information (DCI) transmissions, an indication to transmit M uplink transmissions at least partially overlapped in time, using more than one beam states. M may be an integer. In some embodiments, the wireless communication node may receive a first uplink transmission among the M uplink transmissions. In some embodiments, the wireless communication node may cause the wireless communication device to cancel or delay uplink transmissions other than the first uplink transmission among the M uplink transmissions.

In some embodiments, the wireless communication node may cause the wireless communication device to determine the first uplink transmission according to a priority of a transmission reception point (TRP) or a panel related to the M uplink transmissions. In some embodiments, the wireless communication node may cause the wireless communication device to determine the first uplink transmission as an uplink transmission related to a TRP or a panel that has a highest priority among a plurality of TRPs or panels, according to a configuration that is predefined or a configuration of the wireless communication node.

In some embodiments, the wireless communication node may cause the wireless communication device to determine a transmission reception point (TRP) corresponding to the uplink transmission, according to a control resource set (CORESET) pool identifier (ID) that is associated with a downlink control information (DCI) that indicates a beam state of the uplink transmission. In some embodiments, the wireless communication node may cause the wireless communication device to determine at least one power control parameter associated with one or more beam states.

In some embodiments, the at least one power control parameter may include at least one of: P0 and alpha for the uplink transmission comprising a physical uplink shared channel (PUSCH), configured by an index from a P0 and alpha parameter pool configured for the PUSCH or for an uplink channel; P0 for the uplink transmission comprising a physical uplink control channel (PUCCH) determined by an P0_offset and a P0 for an associated PUSCH; or a closed-loop power control index that is: configured for the one or more beam states via radio resource control (RRC) signaling, or associated with the one or more beam states when activated by a medium access control control element (MAC CE), or associated with the one or more beam states according to a transmission reception point (TRP) associated with the one or more beam states, or shared by a plurality of transmission reception points (TRPs), and corresponds to an independent respective closed-loop power control for each TRP of the plurality of TRPs.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
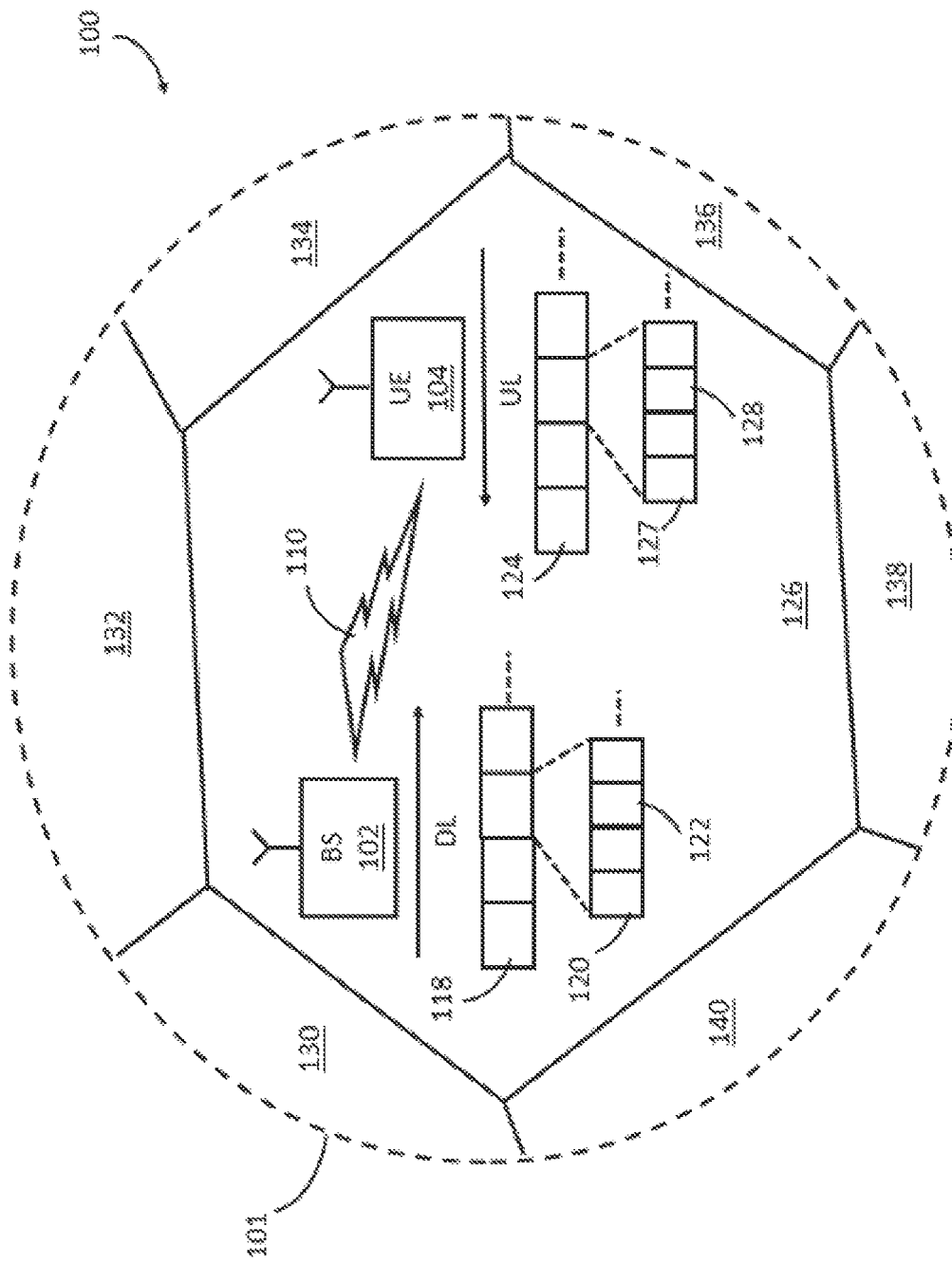
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
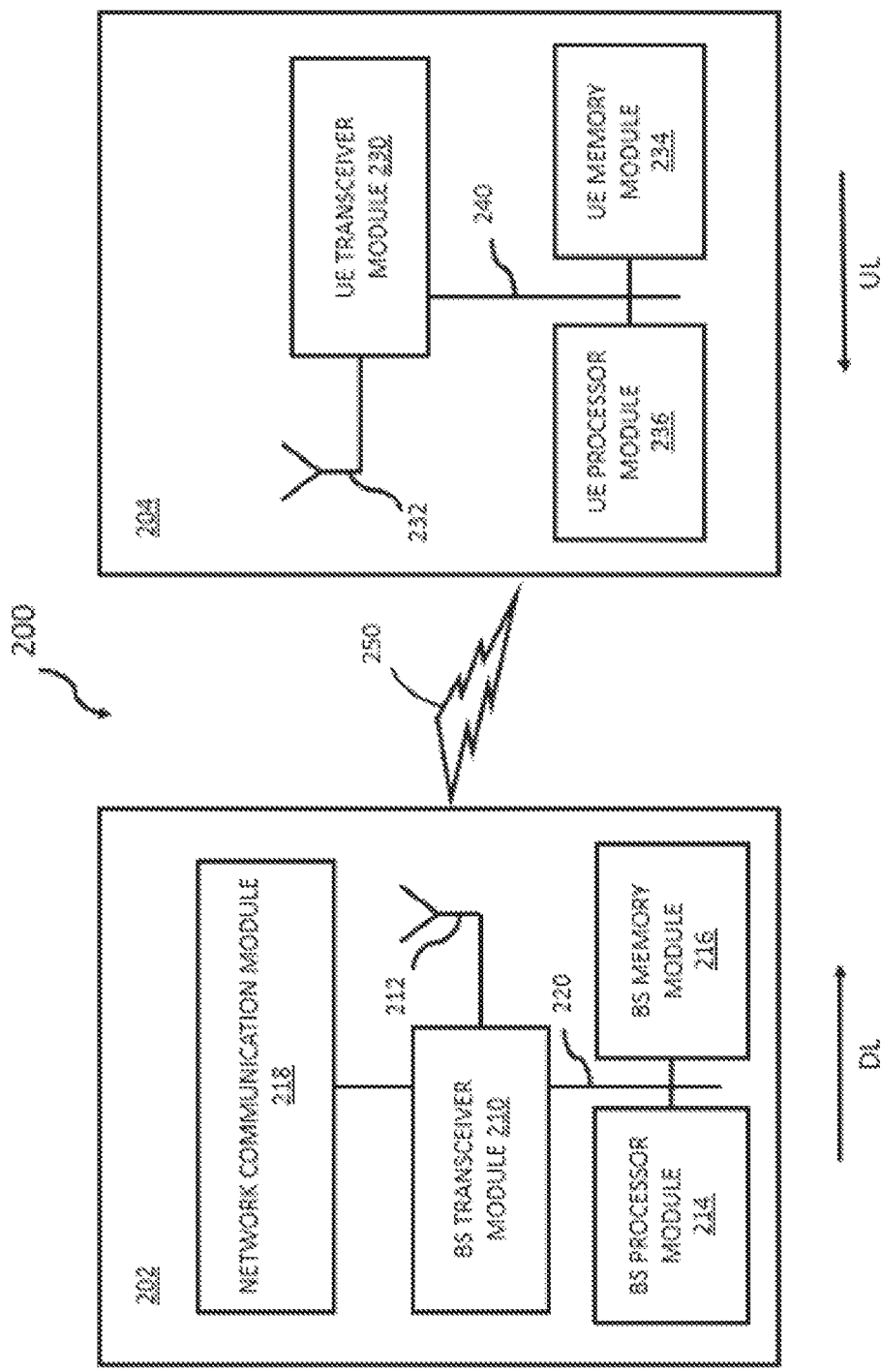
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Communications in Multiple Transmit/Reception Point (MTRP) Environments There are following issues for uplink transmission in multiple transmit receive point (MTRP) scenario. The first issue may include determining the relation between UL TCI state and TRP, which may be not clear. The second issue may be that avoiding multi-beam for UL signal, which may be not clear. The third issue may include determining port and precoding information for PUSCH, which may be not clear. The fourth issue may be that power control framework is not clear for UL transmission in MTRP scenario.

One of the features of the new radio (NR) technology of fifth generation (5G) mobile communication systems may be the support of high frequency bands. High frequency bands may have abundant frequency domain resources, but wireless signals in high frequency bands may decay quickly and coverage of the wireless signals may become small. Thus, transmitting signals in a beam mode may be able to concentrate energy in a relatively small spatial range and to improve the coverage of the wireless signals in the high frequency bands. In the beam scenario, as the time and position change, a beam pair between a base station and a user equipment (UE) may also change (e.g., misalignment). Thus, a flexible beam update mechanism may be used to address these and other issues.

The NR technology may support a basic beam mechanism with an assumption that the UE has a single panel (e.g., an antenna array) and communicates with a single transmission (Tx) reception (Rx) point (TRP). However, the basic beam mechanism may not be able to indicate the beams for multiple channels and/or multi-panels/multi-TRPs scenario, especially for uplink channels. Under some approaches, the NR may support beam indication for uplink and downlink separately, also for data and control channels independently.

The evolution of multi-beam technology includes the following two directions. The first may entail a unified TCI (transmission configuration indicator) architecture. Under the unified TCI architecture, a TCI state may be used to indicate beam state for both uplink and downlink transmission. Specifically, the TCI state may be only used for beam state indication for downlink transmission, while not used for uplink transmission. The existing beam state indication method for uplink may include defining respective spatial relations for a sounding reference signal (SRS) and PUCCH resources. The spatial relation may refer to an existing uplink (UL) or downlink (DL) reference signal (RS), then the beam state for SRS and physical uplink control channel (PUCCH) transmission can be indicated via the spatial relation. The beam state of physical uplink shared channel (PUSCH) transmission can be indicated via existing SRS resources.

Another approach may entail a common beam state for UL and DL, as well as data and control channels. For example, the new beam state indicated by DCI may be used for multiple channels (e.g., target transmission), such as physical downlink shared channel (PDSCH), physical downlink control channel (PDCCH), PUCCH, and PUSCH, among others. Specifically, the beams may be independently indicated for uplink and downlink transmissions; also data channel and control channel, and reference signal may have independent beam state indication methods respectively.

Figure 3:
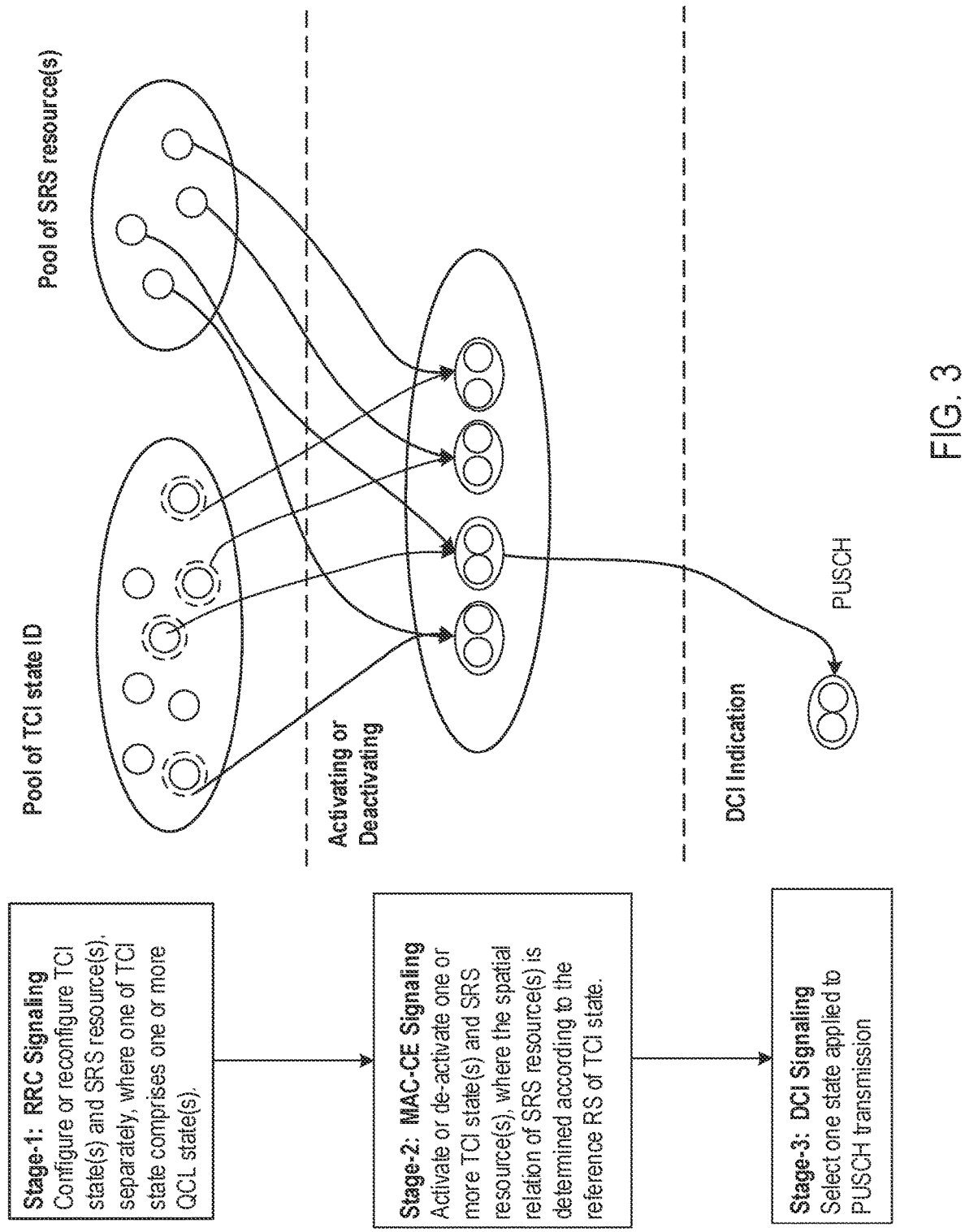
FIG. 3 illustrates a sequence diagram of a process for selecting from a pool transmission configuration indicator (TCI) states and sounding reference signal (SRS) resources in accordance with an illustrative embodiment.

Referring now to FIG. 3, depicted is a sequence diagram of a process for selecting from a pool of transmission configuration indicator (TCI) states and sounding reference signal (SRS) resources. Under stage 1, using a radio resource control (RRC) signaling, TCI states and SRS sources may be configured or re-configured separately. One of the TCI states may include one or more quasi-co-location (QCL) states. Under stage 2, using a media access control control element (MAC-CE) signaling, one or more TCI states may be activated or de-activated. TCI state may be associated with SRS resource. The spatial relation of SRS resources may be determined according to the reference RS of the TCI state. Under stage 3, at least one state may be selected to be applied to a channel or a signal, such as PDSCH, PDCCH, PUCCH, or PUSCH (e.g., as depicted), or DL/UL reference signal.

The present section is organized as follows. The first subsection describes determining transmission parameters for an uplink signal (e.g., PUSCH). The second subsection discusses indicating UL TCI by UL TCI state code-point applied to UL signals in a time division multiplexed (TDM) manner, with the UL signal corresponding to the TRP with high priority transmitted and other UL signals canceled or delayed. The third subsection describes a power control procedure for MTRP, with P0 for PUCCH can be deduced by an P0_offset and P0 for PUSCH; and the closed-loop power control index configured to the TCI state by RRC signaling, or attached with a TCI state when it is activated by a MAC CE. The fourth subsection discusses a process for communicating in MTRP environments.

Part I. Selecting Reference SRS Resource for PUSCH and to Determine Port and Precoding Information for PUSCH.

A UE may receive one or more SRS resource set(s) configured by gNB. Each SRS resource set may include at least one SRS resource. The UE may receive a TCI state indication (also referred generally as TCI state) information which indicates at least one TCI state. A TCI state can be also called a beam state. The UE may determine transmission parameters for an uplink signal (e.g. PUSCH), according to the TCI state indication information and the SRS resource(s). As used in the present disclosure, The UL beam and DL beam may also be referred as UL TCI state and DL TCI state respectively.

Figure 4:
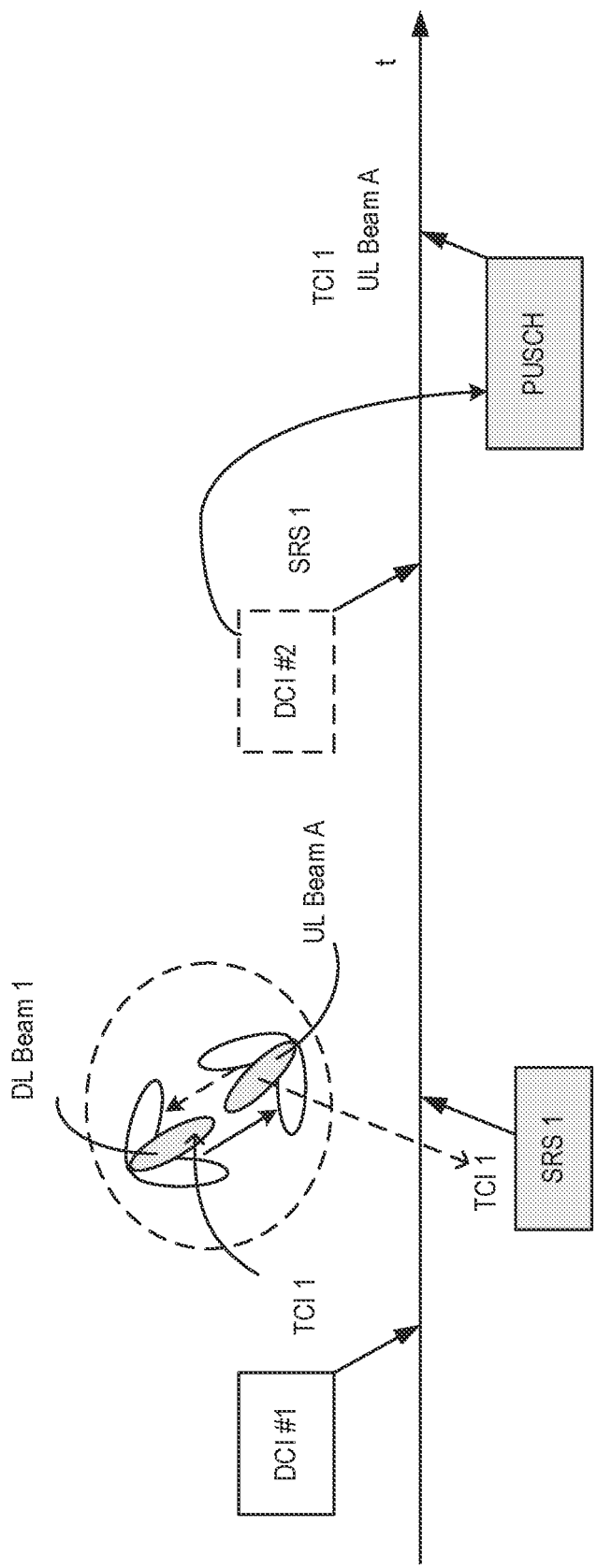
FIG. 4 illustrates a sequence diagram of a managing uplink (UL) and downlink (DL) beams using control information and sounding reference signals (SRSs) resources in accordance with an illustrative embodiment.

In some embodiments, the UE may determine transmission parameters for SRS resource according to the indicated TCI state (indication information), and determine transmission parameters for PUSCH based on the SRS resource. Referring now to FIG. 4, depicted is a block diagram of a system for managing uplink (UL) and downlink (DL) beams using control information and sounding reference signals (SRSs) resources. As shown, a gNB may indicate TCI state 1 by DCI #1 to a UE. The UE may transmit SRS 1 with TCI state 1 indicating transmission parameter(s). For instance, TCI state 1 may indicate a DL beam 1. When the DL beam 1 is used for UL signal transmitting, UE may select a proper UL beam (E.g., UL beam A), for SRS (SRS resource or transmission), based on previous beam management results. Beam correspondence between DL and UL may be used. Then a PUSCH transmission may be scheduled by DCI #2 indicating SRS 1. The UE may determine transmission parameters for PUSCH according to SRS 1. The PUSCH may be transmitted by applying the same transmit beam as SRS 1.

Figure 5:
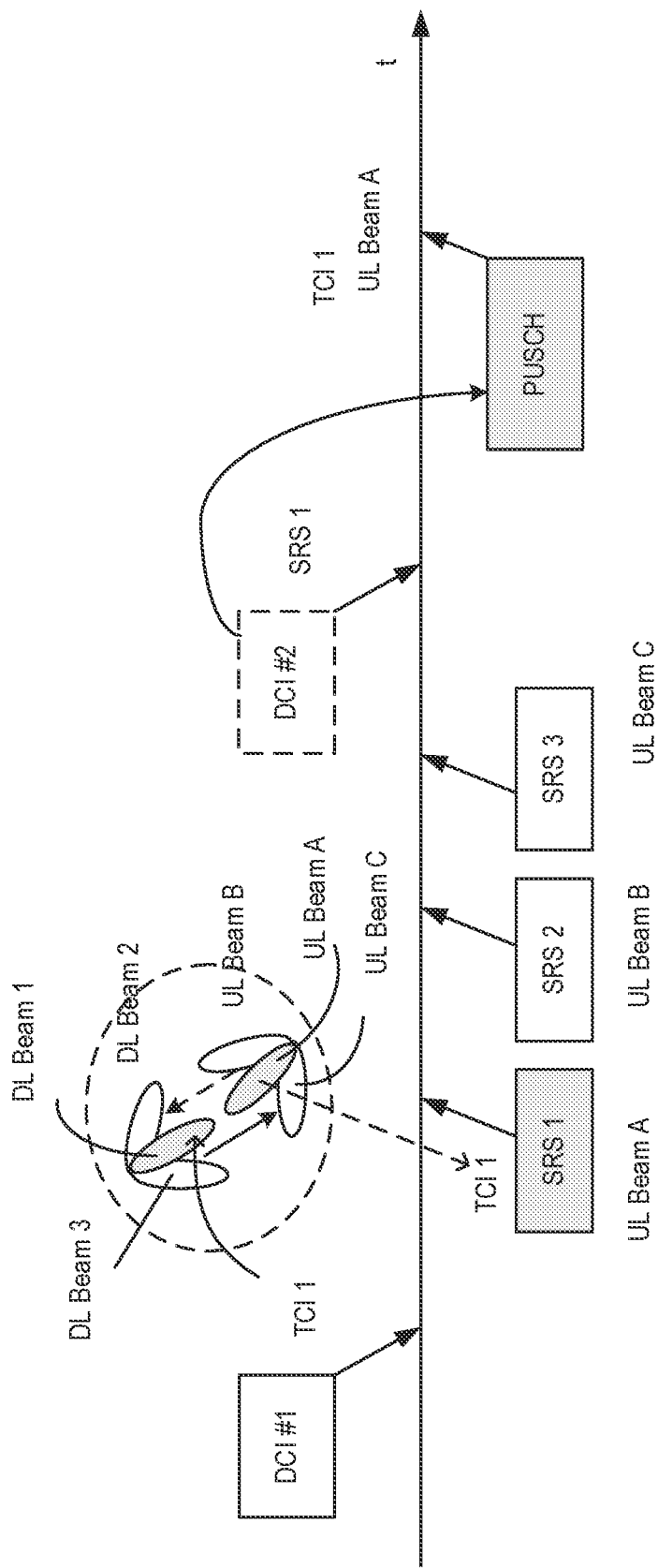
FIG. 5 illustrates a sequence diagram of managing uplink (UL) and downlink (DL) beams using multiple sets of control information and sounding reference signals (SRSs) resources in accordance with an illustrative embodiment.

In some embodiments, the UE may determine transmission parameters for SRS resource(s) according to the indicated TCI state (indication information), such as a set or subset of TCI states activated by MAC CE related to the indicated TCI state. The UE may determine transmission parameters for PUSCH based on the SRS resource(s). Referring now to FIG. 5, depicted is a block diagram of a system for managing uplink (UL) and downlink (DL) beams using multiple sets of control information and sounding reference signals (SRSs) resources.

As depicted, gNB may indicate TCI state 1 by DCI #1 to a UE. The UE may transmit SRS resources by applying TCI states which belong to TCI state set related to the indicated TCI state (e.g., TCI state 1), activated by MAC CE. In this case, TCI states related to DL beam 1, 2 and 3 may be assumed as TCI state set activated by MAC CE. There may be at least 3 SRS resources transmitted by applying UL beam A, B, and C corresponding to DL beam 1, 2 and 3 respectively. Then, a PUSCH transmission may be scheduled by DCI #2 indicating SRS 1. The UE may determine transmission parameters for PUSCH according to SRS 1. The PUSCH may be transmitted by applying the same transmit beam as SRS 1.

In some embodiments, a TCI state may be associated with SRS resource set or SRS resource. In some embodiments, the usage of the SRS resource set or SRS resource may be the same as the transmit type for the PUSCH. The usage of the SRS resource set or SRS resource comprises: beam management (BM), antenna switching (AS), codebook based (CB) and non codebook based (NCB). The transmit type may include: codebook based (CB) and non-codebook based (NCB). The usage may be configured for the SRS resource set, so the usage of SRS resource may refer to the usage configured for the SRS resource set which the SRS resource belongs to. For codebook based PUSCH transmission, gNB may indicate a precoding matrix (also called codeword) for a set of predefined precoding matrices (also called codebook). For non codebook based PUSCH transmission, gNB may indicate port selection information, and may not indicate precoding matrix. In some embodiments, the TCI state may be associated with SRS resource set or SRS resource when or after it is activated by MAC CE. In some embodiments, the TCI state and its associated SRS resource set may be related to the same TRP. In some embodiments, the TCI state and its associated SRS resource may be related to the same TRP.

TRP can be linked with the concepts of a control resource set (CORESET) pool ID, PCI (physical cell ID), TCI state (group), or beam state (group). In some cases, the TRP can be replaced by any of the above concepts. When gNB supports M TRPs, gNB can indicate one or more TCI states (e.g. M TCI states) by TCI state indication information, such as TCI state codepoint. For M>1, M TCI states can be associated with M TRPs.

Figure 6:
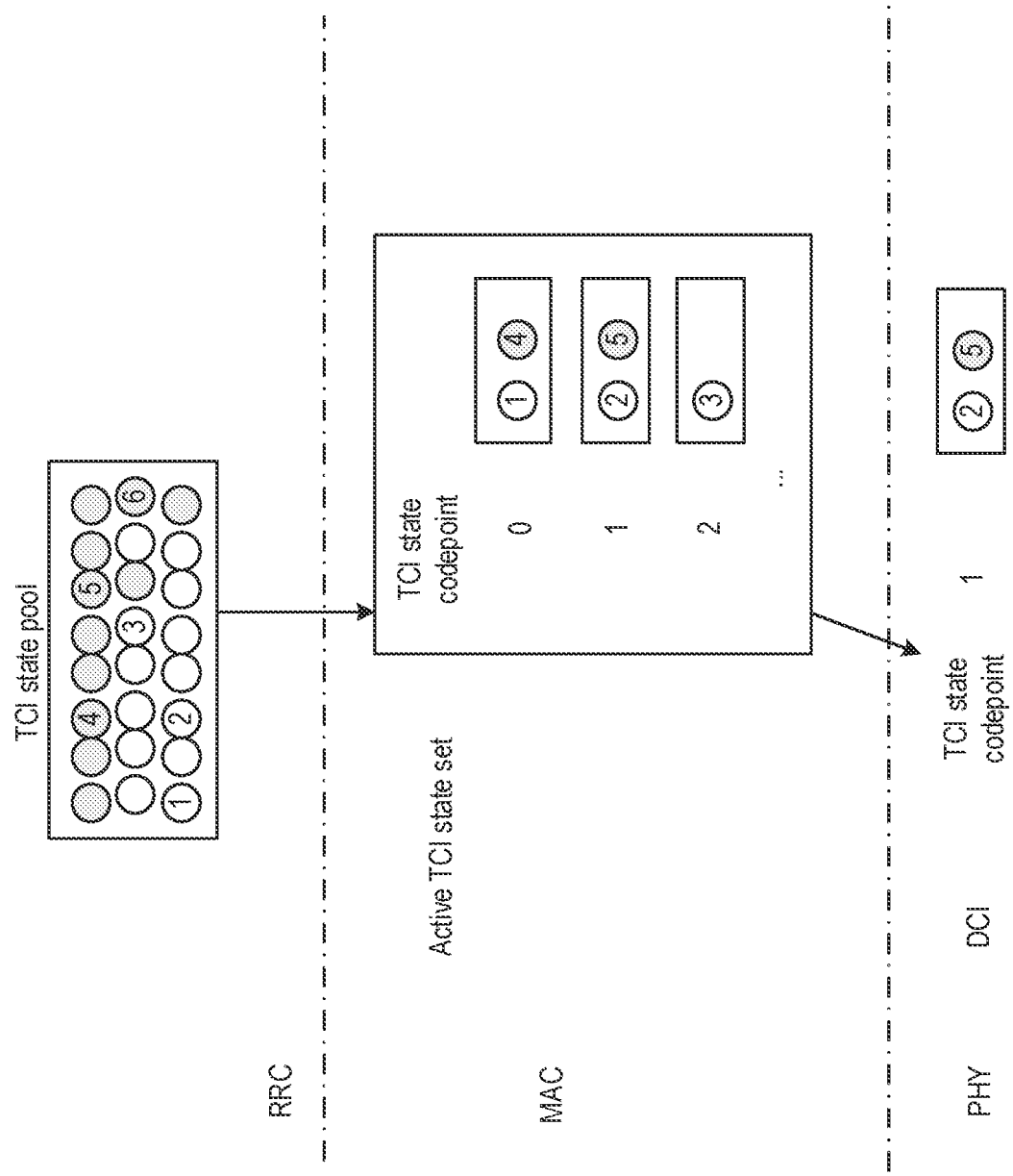
FIG. 6 illustrates a sequence diagram of selecting TCI state codepoint for a multiple transmit/reception point environment in a single control information scheme in accordance with an illustrative embodiment.

Referring now to FIG. 6, depicted is a sequence diagram of a selecting TCI state codepoint for a multiple transmit/reception point environment in a single control information scheme. If S-DCI (single-DCI) scheme is adopted in MTRP scenario, the TRP information can be determined by the position of TCI state in TCI state codepoint. Assuming M=2, when a TCI state codepoint indicates 2 TCI states, the first TCI state may be associated with the first TRP and the second TCI state is associated with the second TRP. As shown, a set of TCI states may be activated by MAC CE in MAC layer. For each TCI state codepoint value, there may be one or two TCI states. For 2 TCI states for one TCI state codepoint value, the 2 TCI states may be related to different TRPs. In the depicted example, TCI state codepoint 1 is indicated in DCI, which means TCI state 2 and 5 are related to the first TRP and the second TRP respectively.

Figure 7:
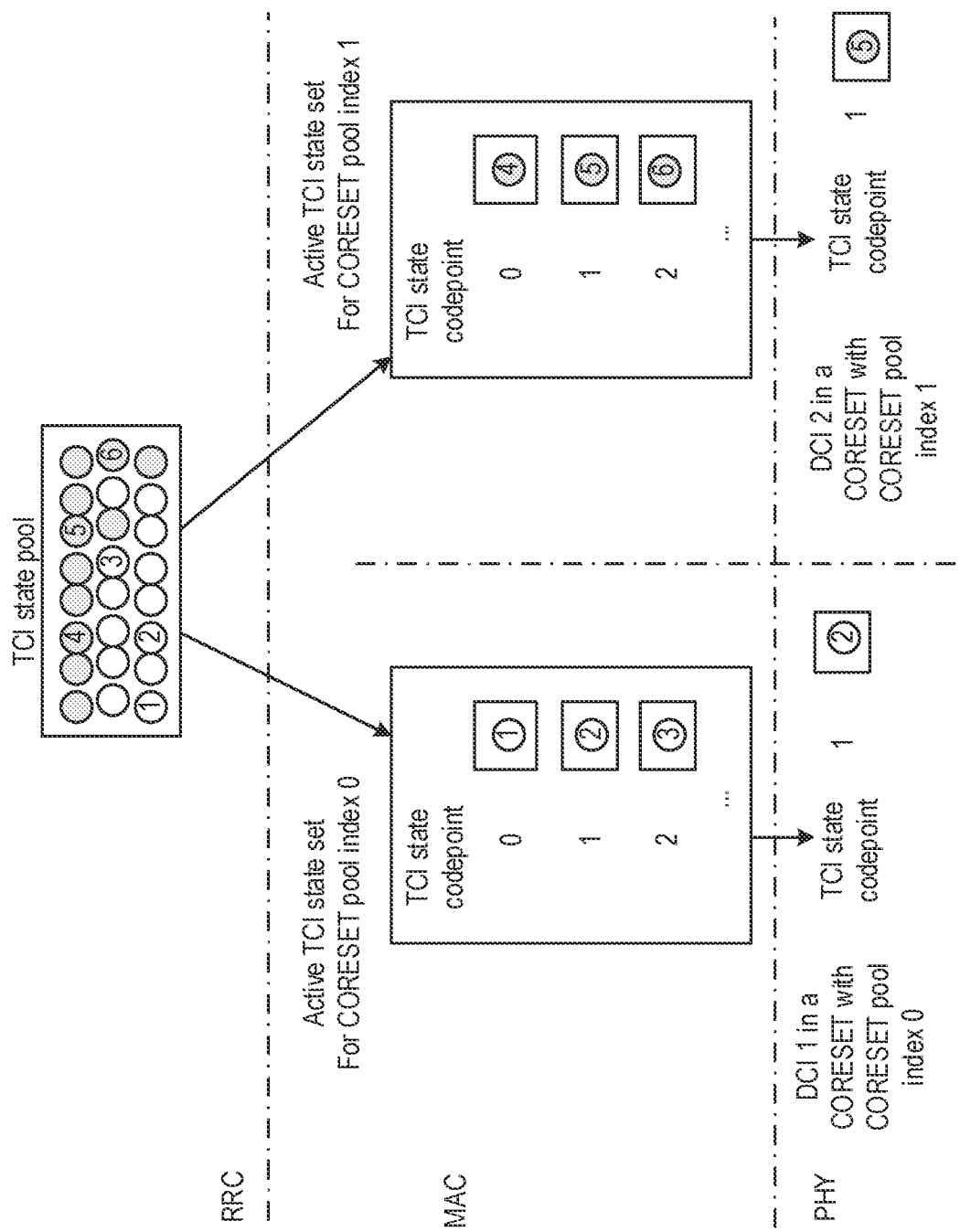
FIG. 7 illustrates a sequence diagram of selecting TCI state codepoint for a multiple transmit/reception point environment in a set of control information scheme in accordance with an illustrative embodiment.

Referring now to FIG. 7, depicted is a sequence diagram of selecting TCI state codepoint for a multiple transmit/reception point environment in a set of control information scheme. If M-DCI (multiple-DCI) scheme is adopted in MTRP scenario, the TRP information can be determined by CORESET pool. Specifically, a TCI state may be indicated in a DCI, and the DCI can be transmitted from the first TRP or the second TRP. The MAC CE may have activated 2 TCI state sets for the 2 TRPs with CORESET pool index as identification. If the DCI is in a PDCCH with a CORESET that has CORESET pool index=0, the UE may interpret the TCI state codepoint in an active TCI state set with CORESET pool index=0. The UE may determine TCI state from a DCI related to CORESET pool index=1 according to an active TCI state set with CORESET pool index=1. As shown in the depicted example, DCI 1 may be associated with the first TRP with CORESET pool index=0, and DCI 2 may be associated with the second TRP with CORESET pool index=1.

When gNB supports multiple TRPs, gNB may configure M>1 SRS resource sets with usage of a codebook or non-codebook, associated with N different TRPs. M and N are positive integer, with M>=N. Assuming M=2, N=2, then there may be 2 SRS resource sets with usage of the codebook. The TRP can be determined according to SRS resource set ID. In one example, SRS resource set with smaller SRS resource set ID may correspond to the first TRP, and the SRS resource set with larger SRS resource set ID may correspond to the second TRP.

When gNB supports multiple TRPs, gNB may configure 1 SRS resource set with usage of codebook or non-codebook. The SRS resource set may include 2 SRS resources, which are associated with 2 TRPs respectively. The TRP can be determined according to SRS resource index in the SRS resource set. In on example, SRS resource with smaller SRS resource index in the SRS resource set may correspond to the first TRP, and the SRS resource with larger SRS resource index in the SRS resource set may correspond to the second TRP.

With the relation between TCI state and TRP and the relation between SRS resource or SRS resource set and TRP, the relation (or association) between TCI state and SRS resource or SRS resource set can be determined based on the same associated TRP. TCI state and SRS resource or SRS resource set corresponding to the same TRP may have association relation. In some cases, TRP may be a medium to associate TCI state, SRS resource, and SRS resource set.

In some embodiments, the association between TCI state and SRS resource set may be determined according to SRS resource set ID and TCI state position in TCI state codepoint. For example, M TCI states in a TCI state codepoint may correspond to M SRS resource sets respectively in ascending order or in descending order. In another example, in MTRP scenario, on one hand, gNB may configure TCI state pool (list) for a UE by RRC signaling. The RRC signaling may include multiple TCI states (e.g., 128 TCI states). The gNB may activate a set of TCI states (e.g. 8 TCI states) from the TCI state pool by MAC CE. Then, the gNB can indicate TCI state codepoint which indicates one or more TCI state from the active TCI state set by DCI. On the other hand, gNB may configure 2 SRS resource sets with usage of "codebook". For S-DCI scheme in MTRP scenario, if there are 2 TCI states indicated by a TCI state codepoint, the first TCI state may correspond to the SRS resource set with smaller SRS resource set ID within the 2 configured SRS resource sets. The second TCI state may correspond to the SRS resource set with lager SRS resource set ID within the 2 configured SRS resource sets.

In some embodiments, the association between TCI state and SRS resource set may be determined according to SRS resource set ID and CORESET pool index related to the DCI which indicated the TCI state. For example, TCI state with CORESET pool index 0, may be associated with the smallest SRS resource set ID in certain M SRS resource sets. The M SRS resource sets may be configured with usage of one of codebook and non-codebook. The usage may be the same as transmit type of PUSCH. The TCI state with CORESET pool index 0 may imply that the DCI which contains the TCI state may be related to a CORESET with CORESET pool index 0. For example, there may be 2 SRS resource sets with usage of the codebook, and SRS resource IDs are 3 and 4. Then SRS resource set with SRS resource ID 3 may be associated with TCI state with CORESET pool index 0.

In some embodiments, the association between TCI state and SRS resource may be determined according to SRS resource index in SRS resource set and TCI state position in TCI state codepoint. For example, M TCI states in a TCI state codepoint may correspond to M SRS resources in SRS resource set respectively in ascending order or in descending order. The SRS resource index in SRS resource set may be the index of SRS resources in the SRS resource set, which is a local index instead of a global one. For example, the first SRS resource in SRS resource set may be associated with the first TCI state in TCI state codepoint, and the second SRS resource in SRS resource set may be associated with the second TCI state in TCI state codepoint.

In some embodiments, the association between TCI state and SRS resource may be determined according to SRS resource index in SRS resource set and CORESET pool index related to the DCI which indicated the TCI state. Further, with indicated TCI state, UE may determine SRS resource set associated with TCI state according to the relation between TCI state and SRS resource set. The UE may determine SRS resource referred by PUSCH according to SRI in UL grant for PUSCH.

Furthermore, UE may determine SRS resource based on the relation between TCI state and SRS resource, and determines port information for PUSCH according to TPMI or port selection information for PUSCH. For codebook based scheme, DCI scheduling PUSCH may include at least SRI field and TPMI (transmit precoding matrix index) and number of layers field. SRI field may indicate one SRS resource from SRS resource set, the SRS resource supports at least one port. TPMI may indicate precoding matrix in a predefined precoding matrices set i.e. codebook, for PUSCH. When there is only one SRS resource in SRS resource set, SRI may be absent. UE may determine the only one SRS resource in SRS resource set as referred SRS resource for PUSCH.

For non-codebook based scheme, SRI may indicate one or more SRS resources. Each SRS resource may support one port. In some embodiments, for non-codebook based scheme, SRI may indicate one SRS resource. The SRS resource may support one or more ports. Transmission scheme and MIMO precoding matrix indication (TPMI) or port selection information may indicate port combination. UE may determine precoder for PUSCH according to the port combination.

The TPMI or port selection information may be used to indicate port combination. The precoding matrix corresponding to TPMI may include the primary diagonal elements which are equal to 0 or 1, and the non-primary diagonal elements which are all 0s. The port selection information can be index of predefined port combinations. When the number of port is 2, the two ports may be port #0 and port #1. Port combinations may include: {#0}, {#1}, {#0, #1}. If the port combinations are indicated by TPMI, the matrices can be:

$$\begin{bmatrix} 1 & 0 \\ 0 & 0 \end{bmatrix}, \begin{bmatrix} 0 & 0 \\ 0 & 1 \end{bmatrix}, \begin{bmatrix} 1 & 0 \\ 0 & 1 \end{bmatrix}$$

The coefficients of the matrices are not shown. These matrices may only aim to indicate port combination. In implementation, coefficients of the matrices may be factored in. The coefficients of the matrices are not shown. These matrices may only aim to indicate port combination. In implementation, coefficients of the matrices may be factored in.

When the number of port is 4, the 4 ports may be port #0, #1, #2 and port #3. Port combinations may include the following 15 selections: {#0}, {#1}, {#2}, {#3}, {#0, #1}, {#0, #2}, {#0, #3}, {#1, #2}, {#1, #3}, {#2, #3}, {#0, #1, #2}, {#0, #1, #3}, {#0, #2, #3}, {#1, #2, #3}, {#0, #1, #2, #3}. If the port combinations are indicated by TPMI, the matrices can be:

$$\begin{bmatrix} 1&0&0&0 \\ 0&0&0&0 \\ 0&0&0&0 \\ 0&0&0&0 \end{bmatrix}, \begin{bmatrix} 0&0&0&0 \\ 0&1&0&0 \\ 0&0&0&0 \\ 0&0&0&0 \end{bmatrix}, \begin{bmatrix} 0&0&0&0 \\ 0&0&0&0 \\ 0&0&1&0 \\ 0&0&0&0 \end{bmatrix}, \begin{bmatrix} 0&0&0&0 \\ 0&0&0&0 \\ 0&0&0&0 \\ 0&0&0&1 \end{bmatrix}, \begin{bmatrix} 1&0&0&0 \\ 0&1&0&0 \\ 0&0&0&0 \\ 0&0&0&0 \end{bmatrix},$$

$$\begin{bmatrix} 1&0&0&0 \\ 0&0&0&0 \\ 0&0&1&0 \\ 0&0&0&0 \end{bmatrix}, \begin{bmatrix} 1&0&0&0 \\ 0&0&0&0 \\ 0&0&0&0 \\ 0&0&0&1 \end{bmatrix}, \begin{bmatrix} 0&0&0&0 \\ 0&1&0&0 \\ 0&0&1&0 \\ 0&0&0&0 \end{bmatrix}, \begin{bmatrix} 0&0&0&0 \\ 0&1&0&0 \\ 0&0&0&0 \\ 0&0&0&1 \end{bmatrix}, \begin{bmatrix} 0&0&0&0 \\ 0&0&0&0 \\ 0&0&1&0 \\ 0&0&0&1 \end{bmatrix},$$

$$\begin{bmatrix} 1&0&0&0 \\ 0&1&0&0 \\ 0&0&1&0 \\ 0&0&0&0 \end{bmatrix}, \begin{bmatrix} 1&0&0&0 \\ 0&1&0&0 \\ 0&0&0&0 \\ 0&0&0&1 \end{bmatrix}, \begin{bmatrix} 1&0&0&0 \\ 0&0&0&0 \\ 0&0&1&0 \\ 0&0&0&1 \end{bmatrix}, \begin{bmatrix} 0&0&0&0 \\ 0&1&0&0 \\ 0&0&1&0 \\ 0&0&0&1 \end{bmatrix}, \begin{bmatrix} 1&0&0&0 \\ 0&1&0&0 \\ 0&0&1&0 \\ 0&0&0&1 \end{bmatrix}$$

The coefficients of the matrices are not shown. These matrices may only aim to indicate port combination. In implementation, coefficients of the matrices may be factored in.

Furthermore, the above port combinations may cover all possibilities. In implementation, port combination can only support part of the above port combinations. For example, the gNB may indicate the number of port or layer (e.g., as indicated in X), then the smaller X port indices may be selected. If X=1, only port #0 may be selected. If X=2, the port #0 and port #1 may be selected. If X=3, the port #0, #1 and #2 may be selected. If X=4, all 4 ports may be selected.

Part II. Determining Relation Between TRP and UL TCI State to Avoid Multiple TCI Used for UL Transmissions at the Same Time UL TCI state can be determined associated TRP by similar scheme to DL TCI state. Multiple TCI states cannot be used for different UL signals at the same time. TCI state may be supported for downlink transmission (e.g., DL TCI state). TCI state may be introduced for uplink transmission in next stage (e.g., UL TCI state). The relation between DL TCI state and UL TCI state can be one of the following cases.

Under a first case, the DL TCI state can be directly applied for uplink transmission, and uplink transmission and downlink transmission share the common TCI state. Under a second case, UL TCI state and DL TCI state may be indicated independently (e.g., by different DCI) from a common active TCI state set. Under a third case, the UL TCI state and DL TCI state may be indicated independently (e.g., by different DCI) from different active TCI state sets.

For the first and second cases, the relation between UL TCI state and TRP can be similar to the relation between DL TCI state and TRP. For S-DCI scheme in MTRP scenario, TPR may be determined according to the position of TCI state in TCI state codepoint. For M-DCI scheme in MTRP scenario, TRP may be determined according to the CORESET pool index related to the DCI indicating the UL TCI state. The gNB may configure CORESETs with different CORESET pool index by RRC signaling. The gNB may activate TCI state set for each CORESET pool index by MAC CE. The gNB may indicate TCI state from the active TCI state set by DCI. The DCI may be carried in a PDCCH corresponding to a CORESET related to a CORESET pool index, and the TCI state in DCI may be interpreted by using the active TCI state set related to the CORESET pool index.

In third case, the relation between UL TCI state and TRP can also be similar to the relation between DL TCI state and TRP. For S-DCI scheme in MTRP scenario, TPR may be determined according to the position of UL TCI state in UL TCI state codepoint. UL TCI state codepoint may be defined besides DL TCI state codepoint. For M-DCI scheme in MTRP scenario TRP may be determined according to the CORESET pool index related to the DCI indicating the UL TCI state. The UL TCI state may be activated by MAC CE besides DL TCI state set. If UE is indicated with TCI states related to different TRPs, the transmit rank indicator (TRI) states may not be used simultaneously for uplink transmissions.

For S-DCI scheme in MTRP scenario, UL TCI states indicated by UL TCI state codepoint may be applied to UL signals in TDM (time division multiplexing) manner. For example, UL TCI states indicated by a UL TCI state codepoint may be applied to UL signals in different slots. The first TCI state may be applied to UL signal in slot x. The second TCI state may be applied to UL signal in slot y. y is different from x. The offset between y and x may be fixed or predefined (e.g., 1, 2 or 5, etc.). The first TCI state may used for UL signals in continuous X slots, and the second TCI state may be used for UL signals in another continuous X slots, and this TCI-slot pattern can be repeated if needed. For example, a PUSCH may be transmitted 16 times which lasts 16 slots, and there may be 2 TCI states (TCI 1, TCI 2) indicated by DCI, then the TCI states pattern for 16 slots is {TCI 1, TCI 1, TCI 1, TCI 1, TCI 2, TCI 2, TCI 2, TCI 2, TCI 1, TCI 1, TCI 1, TCI 1, TCI 2, TCI 2, TCI 2, TCI 2}.

For M-DCI scheme in MTRP scenario, DCIs from different TRPs may be independently transmitted. No ideal backhaul may exist between different TRPs, so the UE may be indicated to transmit different UL signals with timing overlapped with each other using different UL TCI states. In this case, the UL signal corresponding to the TRP with high priority can be transmitted. In addition, the other UL signal may be canceled or delayed. The TRP with high priority may be configured by gNB or predefined (e.g., TRP) corresponding to the first or the last TCI state in TCI state codepoint for S-DCI scheme, or by TRP corresponding to the lowest or highest CORESET pool index for M-DCI scheme. TRP may be determined according to the CORESET pool index which is related to the DCI indicating the UL TCI state. UL TCI state set may be activated by MAC CE besides DL TCI state set.

Part III. Power Control Procedure for MTRP Scenario

The gNB may configure TCI state pool for UE, and at least one of the following power control parameters may be configured for or associated with each TCI state or the TCI state(s) to be used for UL transmission: P0 and alpha for PUSCH, and P0 for PUCCH. The parameters P0 and alpha for PUSCH may be configured by an index from P0 and alpha parameter pool configured for PUSCH. The parameters P0 for PUCCH may be configured by an index from P0 parameter pool configured for PUCCH.

In some embodiments, the parameters P0 and alpha for PUSCH can be configured by an index from P0 and alpha parameter pool configured for PUSCH or for uplink channel. The parameters P0 for PUCCH can be deduced by an P0_offset and P0 for PUSCH. P0_offset may be a value configured by gNB. For example, if P0_offset is 3 dB, P0 for PUSCH may be 0 dBm, then P0 for PUCCH may be 0 dBm+3 dB=3 dBm.

Path loss reference signal (PL-RS) may be also configured for or associated with each TCI state or the TCI state(s) which is possible to be used for UL transmission. PL-RS may refer to an RS which is used for PL (pathloss) measurement. The PL-RS may be used for at least one of PUSCH, PUCCH, and SRS.

PL-RS can be configured by an index in a PL-RS pool configured for PUSCH, or a PL-RS pool configured for PUSCH, or a PL-RS pool configured for uplink channel. The relation between PL-RS and TCI state can be updated by MAC CE. Regarding closed-loop power control, the closed-loop power control index can be configured for a TCI state by RRC signaling, or attached with a TCI state when activated by a MAC CE.

The closed-loop power control index can also be implicitly associated with TCI state, according to the TRP that the TCI state is associated with. For MTRP scenario, closed-loop power control for different TRPs may be independent. For example, the TCI state associated with the first TRP may be related to the first closed-loop power control, and the TCI state associated with the second TRP may be related to the second closed-loop power control.

In some embodiments, the closed-loop power control index can be shared by different TRPs, but may be seen as independent closed-loop power control. This may mean TPC related to one TRP can only be used to update a closed-loop power control related to this TRP, but cannot be used for a closed-loop power control related to another TRP even if the indices of these two closed-loop power control are the same.

Part IV. Communicating in MTRP Environments

Figure 8:
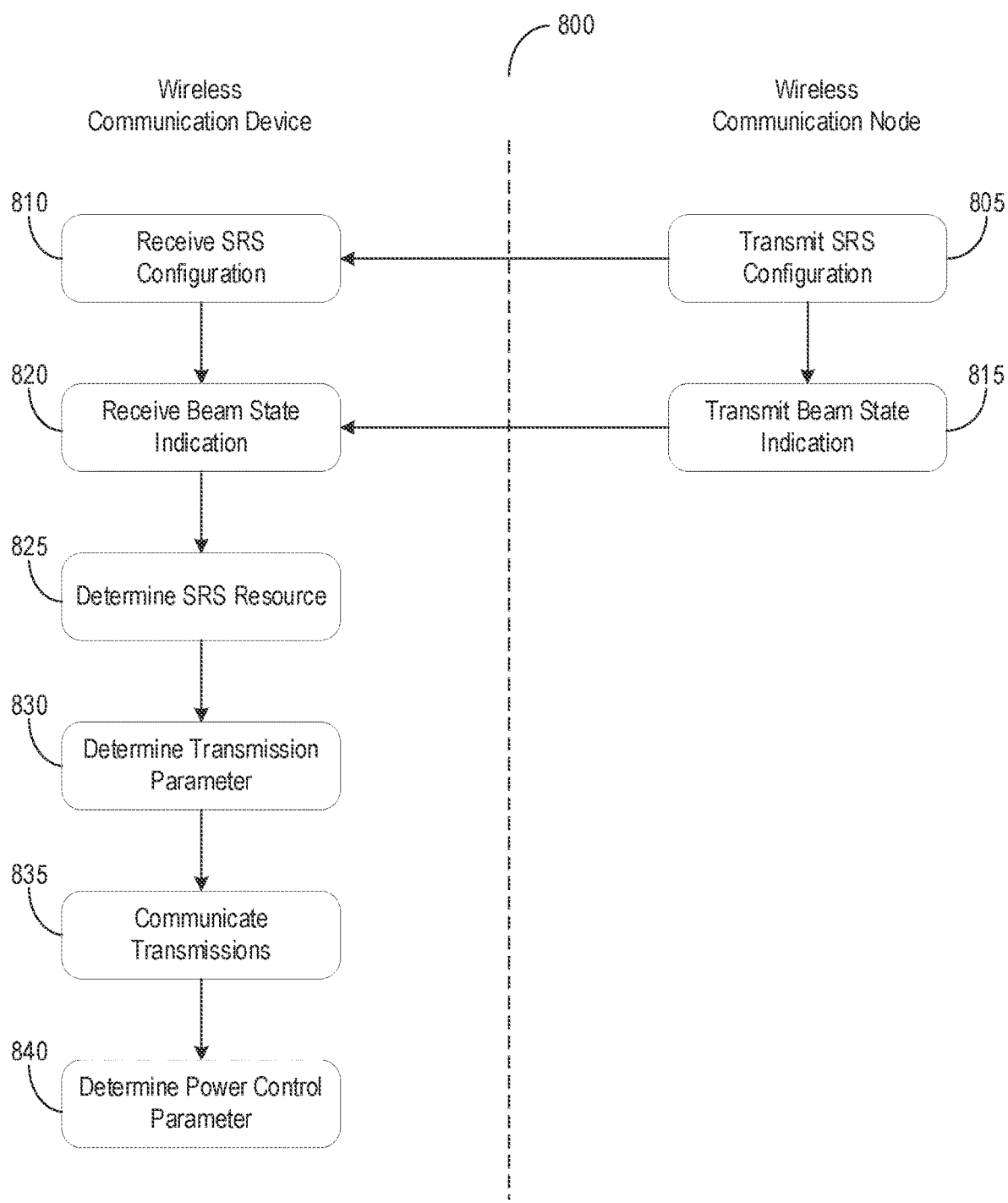
FIG. 8 illustrates a flow diagram of a method of communication in multiple transmission/reception point (TRP) environments in accordance with an illustrative embodiment.

Referring now to FIG. 8, depicted is a flow diagram of a method 800 for communicating in multiple transmit/reception point (MTRP) environments. The method 800 may be implemented using or performed by any of the components detailed herein in conjunction with FIGS. 1-7, for example, BS 102 and UE 104, among others. In brief overview, a wireless communication node may transmit a sounding reference signal (SRS) configuration (805). A wireless communication device may receive the SRS configuration (810). The wireless communication node may transmit a beam state indication (815). The wireless communication device may receive the beam state indication (820). The wireless communication device may determine a SRS resource (825). The wireless communication device may determine a transmission parameter (830). The wireless communication device communication transmissions (835). The wireless communication device may determine a power control parameter (840).

In further detail, a wireless communication node (e.g., BS 102) may send, provide, or otherwise transmit a sounding reference signal (SRS) configuration to a wireless communication device (e.g., UE 104) (805). The configuration may be via a higher layer configuration (e.g., radio resource control (RRC) signaling or configuration). In some embodiments, the wireless communication node may transmit a configuration of at least one SRS resource. In some embodiments, the wireless communication node may determine, generate, or identify the configuration of the SRS resource for the wireless communication device prior to transmission. The configuration of the SRS resource may be for an uplink (UL) transmission from the wireless communication device to the wireless communication node. The UL transmission may include, for example, a physical uplink shared channel (PUSCH) and a physical uplink control channel (PUCCH). Conversely, the configuration of the SRS resource may be for an downlink (DL) reception from the wireless communication node to the wireless communication device. The DL transmission may include, for example, a downlink uplink shared channel (PDSCH) and a physical downlink control channel (PDCCH).

In some embodiments, the wireless communication node may transmit an SRS resource indicator (SRI) for the UL transmission or the DL reception. In some embodiments, the wireless communication node may transmit a port information for the UL transmission or the DL reception. The port information may define one or more antenna ports of the panel for supporting the UL transmission or the DL reception using the SRS resource. The port information may identify or include a transmitted precoding matrix indicator (TPMI) or port selection information to be used for the SRS resource. For example, TPMI or port selection information for the uplink transmission can be indicated for each beam state or for each SRS resource. In case a DCI indicates a TCI state codepoint which includes 2 TCI state, 2 TPMI or port selection information may be used respectively for the 2 TCI state. A precoding matrix corresponding to the TPMI may identify, define, or otherwise include primary diagonal elements that are each equal to 0 or 1 and non-primary diagonal elements that are each equal to 0. The port selection information may identify or include an index of a predefined port combination.

The wireless communication device may identify, retrieve, or otherwise receive the SRS configuration from the wireless communication node (810). In some embodiments, the wireless communication device may receive the configuration of the at least one SRS resource from the wireless communication node. In some embodiments, the wireless communication node may receive the SRI for the UL transmission or the DL reception. In some embodiments, the wireless communication device may receive the port information (e.g., port selection/combination) for the UL transmission or the DL reception.

The wireless communication node may send, provide, or otherwise transmit a beam state indication to the wireless communication device (815). The wireless communication node may transmit an indication of at least one beam state. The beam state may be used for the UL transmission (e.g., PUCCH or PUSCH) or DL reception (PDCCH or PDSCH). In some embodiments, the wireless communication node may determine, generate, or identify the indication of the beam state for the wireless communication device prior to transmission. In some embodiments, the indication of the beam state may identify or include at least one indication via downlink control information (DCI). In some embodiments, the indication of the beam state may be activated via a media access control, control element (MAC-CE). In some embodiments, the wireless communication node may send, provide, or otherwise transmit the indication of a set of N beam states. The transmission of the indication may be via DCI. The wireless communication device may identify, retrieve, or receive the beam state indication from the wireless communication node (820). The wireless communication device may receive the indication of the beam state. In some embodiments, the wireless communication device may receive indications of beam states from a corresponding set of wireless communication nodes. In some embodiments, the wireless communication device may receive the indication of the set of N beam states via DCI.

In some embodiments, each beam state may identify, define, or otherwise include a quasi co-location (QCL) information, a TCI state, spatial relation information, reference signal information, spatial filter information, or precoding information, among others. The QCL information may define or specify a correlation of transmission among antennae of the wireless communication node. The TCI state may identify or define beamforming parameters for a beam to be used via the panels of the wireless communication device. The spatial relation information may define or specify relationship between the reference signal and the channel (e.g., PUCCH). The reference signal information may define or specify parameters for the SRS to be transmitted by the wireless communication device. The spatial filter information may define or specify the filter to be applied in generating the beam using the antenna panel of the wireless communication device. The precoding information may define or specify a precoding to be applied by the wireless communication device in beamforming transmission.

The wireless communication device may identify or determine a SRS resource (825). In accordance with the received configuration of the SRS resource and the indication of the beam state, the wireless communication device may determine at least one SRS resource. The SRS may be determined or selected from a SRS resource pool configured by a higher layer configuration (e.g., radio resource control (RRC)), and may be used for determined transmission parameters for uplink channels (e.g., PUSCH or PUCCH). The determination may be in response to the receipt of the configuration and the indication from the wireless communication node. In some embodiments, the determined SRS resource may support with one or more ports (e.g., antennae on the wireless communication device). In some embodiments, a usage of the SRS resource or of a SRS resource set may that includes the determined SRS resource may be non-codebook or codebook-based. The non-codebook use (NCB) may identify an association with a precoding matrix for beamforming that is determined in accordance with channel state information. The codebook-based use may identify an association with a predefined precoding matrix.

In some embodiments, the wireless communication may determine an association between the at least one beam state with one or more SRS resources. In accordance with the association, the wireless communication device may determine another SRS resource to be used (e.g., for the SRS itself to be sent to the wireless communication node). In some embodiments, the wireless communication device may determine the at least one SRS resource according to the beam state and the SRS resource indicator (SRI) as identified from the wireless communication node. In some embodiments, one of the at least one beam state may be associated with an SRS resource set or a group of SRS resources from the at least one SRS resource. The SRI may indicate the at least one first SRS resource in the SRS resource set or in the group of SRS resources to be used in beamforming. In some embodiments, in response to the indication of the at least one beam state indicating more than one SRS (e.g., according to the association between beam state and SRS resource), the SRI may indicate the at least one SRS resource to be used in the more than one SRS resource (e.g., only one SRS resource is determined by SRI.).

In some embodiments, the wireless communication device may identify or determine that association between one of the at least one beam state and one of the at least one SRS resource. In some embodiments, the wireless communication device may identify or determine the association between one of one of the at least one group of SRS resources or one of the at least one SRS resource sets. The association may be determined in accordance with the at least one beam state and the at least one SRS resource or the one of the at least one group of SRS resources or the one of the at least one SRS resource set being associated with a transmission reception point (TRP) (e.g., the wireless communication node). In some embodiments, the TRP may include or correspond to a control resource set (CORESET) pool identifier (ID), a physical cell ID (PCI), a transmission configuration indicator (TCI) state, a TCI state group, a beam state or a beam state group, among others.

In some embodiments, the wireless communication device may determine the association in accordance with other information associated with or related to the SRS resource or SRS resource set. In some embodiments, the association may be in accordance with an identifier of the at least one SRS resource in the one of the at least one SRS resource set. In some embodiments, the association may be in accordance with an identifier of the one of the at least one SRS resource set. In some embodiments, the association may be in accordance with an identifier of the one of the at least one group of SRS resources. In some embodiments, the association may be in accordance with a position of the at least one beam state in a transmission configuration indicator (TCI) state codepoint. The position may correspond to an order position as indicated in the TCI codepoint. In some embodiments, the association may be in accordance with a control resource set (CORESET) pool identifier (ID) associated with the one of the at least one beam state. In some embodiments, the wireless communication device may determine the association based on a comparison of the SRS configuration and the indication of the beam state. In some embodiments, the wireless communication device may determine the association, in response to the SRS resource having a spatial relation which is the same as or quasi-co-located with a reference signal (RS) with the beam state.

The beam state may be associated with an SRS resource. In some embodiments, the at least one beam state may be associated with the at least one SRS resource. In some embodiments, each of the at least one beam state may be associated with one of the at least one SRS resource. In some embodiments, each of the at least one beam state is associated with a group of SRS resources from at least one group of SRS resources. A group of SRS resources may correspond to one or more SRS resources within a SRS resource set. A group of SRS resources may also correspond to one or more SRS resources across more than one SRS resource set. In some embodiments, the group of SRS resources may be identified or obtained (e.g., by the wireless communication device) from the SRS resource. In some embodiments, each of the at least one beam state may be associated with an SRS resource set from at least one SRS resource set. The SRS resource set may identify or include one or more SRS resources, and may be configured by RRC signaling.

In some embodiments, the beam state may be associated (e.g., as determined by the wireless communication device) with multiple SRS resources or multiple groups of SRS resources. In some embodiments, one of the at least one beam state may be respectively associated with N SRS resources or N groups of SRS resources in an SRS resource set. The N resources or groups may be within an SRS resource set, and the at least one beam state (N beam states) may correspond to N resources or groups respectively. In some embodiments, one of the at least one beam state may be respectively associated with N SRS resources or N groups of SRS resources. Each of the N SRS resources or the N SRS resource groups may be in a respective SRS resource set. All of the SRS resources may share the same beam state, but with different SRS port (e.g., as in the case of non-codebook based PUSCH transmission). In some embodiments, one of the at least one beam state may be respectively associated with first or last N SRS resources or first or last N groups of SRS resources in an SRS resource set. In some embodiments, each of the at least one beam state may be respectively associated with first or last N SRS resources or first or last N SRS resource groups. Each of the N SRS resources or the N SRS resource groups may be in a respective SRS resource set. "N" may be an integer equal to a number of beam states of the beam state to which the multiple SRS resources or groups of SRS resources are associated. The first N resources may refer to lowest N SRS resource identifiers in the SRS resource set. Conversely, the last N resources may refer to the highest N SRS resource identifiers in the SRS resource set.

The wireless communication device may identify, calculate, or otherwise determine a transmission parameter (830). In accordance with the determined SRS resource, the wireless communication device may determine that transmission parameter for uplink transmissions to the wireless communication node. The uplink transmissions may include, for example, PUSCH or PUCCH or SRS (e.g., included with PUSCH). The transmission parameter may specify, identify, or define a scheme in which the wireless communication device is to communicate with the wireless communication node. In some embodiments, the transmission parameter may include at least one transmission beam, at least one transmit antenna port, the precoder, a number of layers, spatial relation information, the spatial filters, and QCL information, among others. In some embodiments, the wireless communication device may determine a transmission parameter for another SRS resource (e.g., for SRS transmission) in accordance with the beam state indicated by the wireless communication node. In some embodiments, the wireless communication device may determine a transmission parameter for the determined SRS resource in accordance with the beam state. In some embodiments, the wireless communication device may determine a transmission parameter for one or more other SRS resources in accordance with the beam state. The other SRS resources may be associated with the same beam state.

The wireless communication device communicate transmissions with the wireless communication node (835). In some embodiments, the wireless communication device may transmit at least one SRS according to the determined transmission parameter for the SRS resource (or any of other determined SRS resources). The SRS (also referred herein as an SRS transmission) may be used by the wireless communication device to acquire measurements regarding the path between the wireless communication device and the wireless communication node. In some embodiments, the wireless communication device may identify or determine a precoder to apply for the uplink transmission with the wireless communication node. The determination of the precoder may be in accordance with the determined SRS resource and the port information. In some embodiments, the wireless communication device may apply the set of N beam states to the uplink transmission in N time units respectively. N may be an integer equal to a number of beam states in the set. The time unit may include, for example, an OFDM symbol, slot, subframe, frame, milli-second, second, among others.

In communicating, the wireless communication node may send, provide, or otherwise transmit an indication to transmit M uplink transmissions at least partially overlapped in time using one or more beam states. The indication may be transmitted by the wireless communication node to the wireless communication device. In some embodiments, the wireless communication device may receive the indication to transmit M uplink transmissions from the wireless communication node. M may be an integer. For example, each uplink transmission may correspond to a beam state, and the beam state for the M uplink transmissions may be different from one another. In turn, the wireless communication device may transmit in accordance with the indication to the wireless communication node. In some embodiments, the wireless communication device may send, provide, or otherwise transmit a first uplink transmission among the M uplink transmissions. In contrast, the wireless communication device may cancel or delay uplink transmissions other than the first uplink transmission among the M uplink transmissions. The wireless communication node may in turn identify or receive the first uplink transmission from the wireless communication device.

In some embodiments, the wireless communication device may perform the communication in accordance with a priority for the transmissions. In some embodiments, the wireless communication device may identify or determine the first uplink transmission in accordance with a priority of the TRP or a panel related to the M uplink transmissions. The priority may specified or defined by the TRP (e.g., the wireless communication node) for one or more of the uplink transmissions. In some embodiments, the wireless communication device may determine the first uplink transmission as an uplink transmission related to the TRP or the panel that has the highest priority among the set of TRPs or panels (e.g., antennae on the wireless communication device). The determination of the first uplink transmission may be in accordance with a predefined configuration (e.g., by the wireless communication device) or a configuration specified by the wireless communication node. In some embodiments, the wireless communication device may determine the TRP (e.g., one of the wireless communication nodes) corresponding to the uplink transmission. The determination may be according to a control resource set (CORESET) pool identifier (ID) that is associated with a downlink control information (DCI) that indicates a beam state of the uplink transmission.

The wireless communication device may identify, calculate, or otherwise determine a power control parameter (840). The wireless communication device may determine at least one power control parameter associated with one or more beam states. The one or more beam states may be associated with one or more beam states that can be used for the uplink transmission. The power control parameter may include P0 and alpha for the uplink transmission. In some embodiments, the uplink transmission may be a physical uplink shared channel (PUSCH) and may be configured by an index from a P0 and alpha parameter pool configured for the PUSCH or for an uplink channel. In some embodiments, the power control parameter may include P0 for the uplink transmission. The uplink transmission may include a physical uplink control channel (PUCCH) determined by an P0_offset and a P0 for an associated PUSCH. In some embodiments, the power control parameter may include a closed-loop power control index. In some embodiments, the index may be configured for the one or more beam states via radio resource control (RRC) signaling. In some embodiments, the index may be associated with the one or more beam states when activated by a medium access control control element (MAC CE). In some embodiments, the index may be associated with the one or more beam states according to a transmission reception point (TRP) associated with the one or more beam states. n some embodiments, the index may be shared by a plurality of transmission reception points (TRPs), and corresponds to an independent respective closed-loop power control for each TRP of the plurality of TRP.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   receiving, by a wireless communication device from a wireless communication node, a configuration of at least one first sounding reference signal (SRS) resource;
   receiving, by the wireless communication device from the wireless communication node, an indication of at least one beam state;
   determining, by the wireless communication device, an association between one of the at least one beam state and an SRS resource set from at least one SRS resource set, wherein the SRS resource set comprises one or more of the at least one first SRS resource;
   determining, by the wireless communication device, at least one second SRS resource according to the association; and
   determining, by the wireless communication device, a transmission parameter for an uplink transmission, according to the at least one second SRS resource,
   wherein each of the at least one beam state comprises a transmission configuration indicator (TCI) state.

2. The method of claim 1, wherein the indication comprises at least one of indication via a down link control information (DCI) or activation via a medium access control control element (MAC CE) signaling.

3. The method of claim 1, comprising:
   determining, by the wireless communication device, a transmission parameter for the at least one first SRS resource, according to the at least one beam state;
   determining, by the wireless communication device, a transmission parameter for the at least one second SRS resource, according to the at least one beam state; or
   determining, by the wireless communication device, a transmission parameter for at least a third SRS resource, according to the at least one beam state, wherein the third SRS resource is associated with the at least one beam state.

4. The method of claim 3, comprising:
   transmitting, by the wireless communication device, at least one first SRS resource according to the transmission parameter for the at least one first SRS resource, the at least one second SRS resource or the at least one third SRS resource.

5. The method of claim 1, wherein
   the at least one beam state is associated with the at least one first SRS resource;
   one of the at least one beam state is associated with one of the at least one first SRS resource; or
   one of the at least one beam state is associated with a group of SRS resources from at least one group of SRS resources, the at least one group of SRS resources obtained from the at least one first SRS resource.

6. The method of claim 5, wherein:
   each of the at least one beam state is respectively associated with N SRS resources or N groups of SRS resources in an SRS resource set;
   each of the at least one beam state is respectively associated with N SRS resources or N groups of SRS resources, each of the N SRS resources or the N SRS resource groups in a respective SRS resource set;
   each of the at least one beam state is respectively associated with first or last N SRS resources or first N groups of SRS resources in an SRS resource set; or
   each of the at least one beam state is respectively associated with first or last N SRS resources or first N SRS resource groups, each of the N SRS resources or the N SRS resource groups in a respective SRS resource set,
   wherein N is an integer that is equal to a number of beam states of the at least one beam state.

7. The method of claim 5, comprising:
   determining, by the wireless communication device, an association between one of the at least one beam state and one of the at least one first SRS resource or one of the at least one group of SRS resources or one of the at least one SRS resource sets, according to the at least one beam state and the at least one first SRS resource or the one of the at least one group of SRS resources or the one of the at least one SRS resource set being associated with a transmission reception point (TRP).

8. The method of claim 7, wherein the TRP comprises or corresponds to a control resource set (CORESET) pool identifier (ID), a physical cell ID (PCI), a transmission configuration indicator (TCI) state, a TCI state group, a beam state or a beam state group.

9. The method of claim 5, comprising:
   determining, by the wireless communication device, an association between one of the at least one beam state, and one of the at least one first SRS resource or one of the at least one group of SRS resources or one of the at least one SRS resource set, according to at least one of:
      an identifier of the at least one first SRS resource in the one of the at least one SRS resource set;
      an identifier of the one of the at least one SRS resource set; an identifier of the one of the at least one group of SRS resources;
      a position of the at least one beam state in a transmission configuration indicator (TCI) state codepoint; or
      a control resource set (CORESET) pool identifier (ID) associated with the one of the at least one beam state.

10. The method of claim 5, comprising:
    determining, by the wireless communication device, the association between the at least one beam state and the at least one first SRS resource, in response to the at least one first SRS resource having a spatial relation which is same as or Quasi Co-Located (QCLed) with an RS of the at least one beam state; or
    determining, by the wireless communication device, the at least one second SRS resource according to an association between the at least one beam state and the at least one first SRS resource.

11. The method of claim 1, comprising:
    receiving, by the wireless communication device from the wireless communication node, an SRS resource indicator (SRI) for the uplink transmission; and
    determining, by the wireless communication device, the at least one second SRS resource according to the at least one beam state and the SRI,
    wherein one of the at least one beam state is associated with an SRS resource set or a group of SRS resources from the at least one first SRS resource, and the SRI indicates the at least one second SRS resource in the SRS resource set or in the group of SRS resources.

12. The method of claim 1, comprising:
    determining, by the wireless communication device, a trans-mission reception point (TRP) corresponding to the uplink transmission, according to a control resource set (CORE-SET) pool identifier (ID) that is associated with a down link control information (DCI) that indicates a beam state of the uplink transmission.

13. A method, comprising:

transmitting, by a wireless communication node to a wireless communication device, a configuration of at least one first sounding reference signal (SRS) resource;

transmitting, by the wireless communication node to the wireless communication device, an indication of at least one beam state;

causing the wireless communication device to:

determine an association between one of the at least one beam state and an SRS resource set from at least one SRS resource set, wherein the SRS resource set comprises one or more of the at least one first SRS resource;

determine at least one second SRS resource according to the association; and determine a transmission parameter for an uplink transmission, according to the at least one second SRS resource, wherein each of the at least one beam state comprises a transmission configuration indicator (TCI) state.

14. A wireless communication device comprising at least one processor configured to:

receive, via a receiver from a wireless communication node, a configuration of at least one sounding reference signal (SRS) resource;

receive, via the receiver from the wireless communication node, an indication of at least one beam state;

determine an association between one of the at least one beam state and an SRS resource set from at least one SRS resource set, wherein the SRS resource set comprises one or more of the at least one first SRS resource;

determine at least one second SRS resource according to the association; and determine a transmission parameter for an uplink transmission, according to the at least one second SRS resource, wherein each of the at least one beam state comprises a transmission configuration indicator (TCI) state.

15. A wireless communication node, comprising at least one processor configured to:

transmit, via a transmitter to a wireless communication device, a configuration of at least one sounding reference signal (SRS) resource;

transmit, via the transmitter to the wireless communication device, an indication of at least one beam state;

cause the wireless communication device to:

determine an association between one of the at least one beam state and an SRS resource set from at least one SRS resource set, wherein the SRS resource set comprises one or more of the at least one first SRS resource;

determine at least one second SRS resource according to the association; and determine a transmission parameter for an uplink transmission, according to the at least one second SRS resource, wherein each of the at least one beam state comprises a transmission configuration indicator (TCI) state.

* * * * *